United States Patent
Akada et al.

(10) Patent No.: US 6,541,431 B1
(45) Date of Patent: Apr. 1, 2003

(54) LUBRICANT FOR MAGNETIC RECORDING MEDIUM

(75) Inventors: Tamio Akada, Nishinomiya (JP); Yoshinobu Fujii, Nishinomiya (JP); Nagayoshi Kobayashi, Nishinomiya (JP); Rie Fujimoto, Nishinomiya (JP)

(73) Assignee: Matsumura Oil Research Corp., Hyogo (JP)

( * ) Notice: Subject to any disclaimer, the term of this patent is extended or adjusted under 35 U.S.C. 154(b) by 0 days.

(21) Appl. No.: 09/744,158

(22) PCT Filed: May 25, 1999

(86) PCT No.: PCT/JP99/02751
§ 371 (c)(1), (2), (4) Date: Jan. 1, 2001

(87) PCT Pub. No.: WO00/71647
PCT Pub. Date: Nov. 30, 2000

(51) Int. Cl.⁷ .......................... C10M 137/16; G11B 5/72
(52) U.S. Cl. ..................... 508/427; 428/694 TC; 428/694 TF; 428/695; 428/900; 360/135
(58) Field of Search .................. 508/427; 428/694 TC, 428/694 TF

(56) References Cited

U.S. PATENT DOCUMENTS

| | | | |
|---|---|---|---|
| 4,601,843 A | 7/1986 | Carr et al. | 252/78.5 |
| 4,613,548 A | 9/1986 | Lum | 428/411.1 |
| 4,871,625 A | 10/1989 | Dekura et al. | 428/695 |
| 5,015,405 A * | 5/1991 | Kar et al. | 252/49.9 |
| 5,047,270 A * | 9/1991 | Mori et al. | 428/35.2 |
| 5,075,453 A | 12/1991 | Ueyama et al. | 548/413 |
| 5,082,717 A * | 1/1992 | Yaguchi et al. | 428/207 |
| 5,230,964 A * | 7/1993 | Kar et al. | 428/694 |
| 5,273,830 A * | 12/1993 | Yaguchi et al. | 428/523 |
| 5,280,090 A * | 1/1994 | Kurahashi et al. | 525/479 |
| 5,346,771 A * | 9/1994 | Kurahashi et al. | 428/447 |
| 5,441,655 A * | 8/1995 | Odello et al. | 252/49.9 |
| 5,587,217 A | 12/1996 | Chao et al. | 428/65.4 |
| 5,718,942 A * | 2/1998 | Vurens et al. | 427/127 |
| 5,908,817 A | 6/1999 | Perettie et al. | 508/422 |

FOREIGN PATENT DOCUMENTS

| | | |
|---|---|---|
| DE | 197 10 205 A1 | 10/1997 |
| EP | 0 287 892 A2 | 10/1988 |
| JP | 63-103428 A | 5/1988 |
| JP | 63-258993 A | 10/1988 |
| JP | 63-278998 A | 11/1988 |

OTHER PUBLICATIONS

Patent Abstracts of Japan, Publication No. 06–328998, Publication Date Nov. 29, 1994.

Mate, C. M. et al.; "Investigation of Phosphazene Additive for Magnetic Recording Lubrication"; *IEEE Transactions on Magnetics*; vol. 34, No. 4; 1998.

Patent Abstracts of Japan, Publication No. 63103428 A, Publication date May 9, 1998.

\* cited by examiner

*Primary Examiner*—Ellen M. McAvoy
(74) *Attorney, Agent, or Firm*—Kubovcik & Kubovcik

(57) ABSTRACT

The present invention provides a lubricant for magnetic recording medium which comprises, as an effective component, a phosphazene compound of formula $$[N{=}P[O(C_6H_4){-}(A)_z{-}R]_a[OCH_2{-}(B)_xH]_b]_y \quad (1)$$

wherein A is $-C_6H_4-$ or $-OC_6H_4-$, B is fluorine-containing alkylene group, R is hydrogen atom, fluorine atom, $C_{1-4}$ alkyl, $C_{1-4}$ alkoxy or $C_{1-4}$ haloalkyl, a and b are a real number of 0 to 2, satisfying a+b=2, x is 1, 2, 3 or 4, y is 3 or 4, and z is 0 or 1.

3 Claims, No Drawings

LUBRICANT FOR MAGNETIC RECORDING MEDIUM

This application is the National Stage Application of PCT/JP99/02751 filed May 25, 1999.

TECHNICAL FIELD

The present invention relates to a lubricant for magnetic recording medium, such as hard disks of large-capacity recording medium, and metal vapor-deposited tapes for 8 mm video tape recorder or digital video cassette. The present invention is suitable for use as a surface lubricant of a hard magnetic disk serving as a recording medium, in a recording device of contact start stop (CSS) method which establishes a contact between a recording medium and a recording/reproducing element when starting and stopping the device.

BACKGROUND ART

Thanks to prevalent internet, intranet, local area network, etc, information can be fetched easily only by gaining access to a network. One of those which support this multimedia era is external recording devices. Of existing large-capacity external recording devices, those of the so-called CSS method are usually employed in which a recording medium layer is provided on a disk substrate having a high strength (hard disk), and the hard disk is rotated at high speed to operate a recording/reproducing element (head). Examples of the hard disk are a stationary magnetic disk, optical disk and optical magnetic disk. Of these, the most prevalent is a device employing the stationary magnetic disk.

In order to increase the capacity of these external recording devices without changing their size, it is necessary to increase the surface recording density of a recording medium layer, for example. This requires that bit size be reduced and the head be brought near the recording medium as much as possible. To reduce a clearance between the head and disk, the unevenness of the disk surface should be minimized. For instance, to obtain a clearance of not more than 100 nm, the unevenness should be not more than 10 nm. However, if the smoothness of the disk surface is increased, the head is liable to be adsorbed onto the disk surface. To obtain high-speed response, it is necessary to increase bit transfer rate and therefore the rotational speed of the disk. For instance, a 3.5-inch hard disk requires a maximum number of revolution of 5400 to 7200 rpm, and the speed of the head as it passes through the periphery of the disk reaches 125 km/hr. Any of the above-mentioned modifications, however, increases considerably the probability of contact between the disk and head, as well as friction therebetween, thus decreasing the reliability.

In view of the foregoing, for protection of the disk surface and head, it is the simplest way to increase the amount of a lubricant applied to the surface of a protective coat for a disk. However, if the amount of a lubricant applied is increased, not only the slide resistance of the. lubricant layer is increased but also the adsorption of the lubricant is enhanced, thereby causing a stop or burning of a spindle motor. For decreasing slide resistance, if a lubricant of low viscosity is used, the lubricant moves and disappears from a protective layer during high-speed rotation of the disk. This causes a contact between the disk and head, and their breakage.

A lubricant, in an extremely simple manner, forms a lubricant film having a uniform thickness of molecules on a protective layer provided on a hard disk such as to reduce friction and wear which may be caused during the rotation of the hard disk and at the start and stop of the device. For protection of the disk and head, there is required a lubricant which has a low slide resistance, large bonding strength to a protective layer, low coefficient of friction, high chemical stability, high thermal stability, high corrosive resistance and lubricity at low temperatures of below −10° C., and, which can form ultrathin films at a low vapor pressure. A lubricant for hard disk is required to have no change in coefficient of friction over 20,000 times in CSS durability. That is, the lubricant should be free from abnormalities such as seizing of the head and blemish of the disk, and the variation in coefficient of friction should be no more than 0.3, even over 20,000 times in a CSS repeated test.

From the point of view of chemical stability, strength, ultrathin film formation and smoothness, Diamond Like Carbon (DLC) is used in the surface protective layer of existing hard disks. This protective layer is, as apparent from its structure, mainly composed of carbon, which leads to a low chemical bonding. Its adhesion therefore merely depends upon hydrogen bond with hydrogen atom or nitrogen atom, and interaction such as van der Waals force.

Thus, perfluoroalkyl polyether oligomer (hereinafter referred to as "PFPE") is usually employed as a lubricant (Monthly magazine "Tribology", No. 99, November, pp37–38, 1995). PFPE has a low surface energy, chemical inertness, low vapor pressure, and thermal stability, which characteristics are derived from fluorocarbon. Unfortunately, it has a drawback that the bonding strength to the protective layer surface is small because of low surface energy, and the lubricant moves and disappears from the protective layer by centrifugal force during the rotation of a disk. To suppress this, an additive of a secondary component is used (U.S. Pat. No. 4,871,625), however, low compatibility deriving from the fluorocarbon of PFPE causes a phase separation, failing to obtain sufficient effect. In order to afford affinity in PFPE, there has been proposed one method in which a functional group, such as hydroxyl group or acylamide group, is introduced into the terminal or center of the main chain of PFPE (FOMBLIN Z derivative, Ausimont S.p.A). Unfortunately, the functional group having such an active hydrogen might decrease chemical stability due to the friction with the head.

An object of the present invention is to provide a lubricant for hard disk which has excellent CSS durability.

DISCLOSURE OF THE INVENTION

The present invention relates to a lubricant for magnetic recording medium which comprises, as an effective component, a phosphazene compound of formula

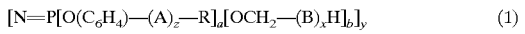  (1)

wherein A is —C$_6$H$_4$— or —OC$_6$H$_4$—, B is fluorine-containing alkylene group, R is hydrogen atom, fluorine atom, C$_{1-4}$ alkyl, C$_{1-4}$ alkoxy or C$_{1-4}$ haloalkyl, a and b are a real number of 0 to 2, satisfying a+b=2, x is 1, 2, 3 or 4, y is 3 or 4, and z is 0 or 1.

Excellent CSS durability of a compound of the invention is based on excellent lubricity, high extreme-pressure performance and excellent adhesion to a DLC protective layer, which characteristics are derived from Compound (1) shown in a number of prior art literatures, e.g., Japanese patent application No. 47680/1982. Here, the excellent adhesion to the DLC protective layer seems to arise from the synergetic effect between the interaction of the terminal hydrogen of fluorocarbon polarized by the adjacent fluorine atom, with hydrogen or nitrogen atom of the DLC protective layer, and the interaction of a phosphazene ring with the DLC protective layer.

In a phosphazene compound of the formula (1) of the invention, a fluorine-containing alkylene group indicated by B is preferably a straight-chain or branched one having 1 to 6 carbon atoms. Such a structure may incorporate an ether linkage. Examples of B are $CF_2$, $CF_2CF_2$, $CF_2CF_2O$, $CF_2CF_2CF_2$, $CF(CF_3)CF_2$, and $CF_2CF_2OCF_2CF_2O$.

As to R, examples of $C_{1-4}$ alkyl are methyl, ethyl, propyl and butyl; examples of $C_{1-4}$ alkoxy are methoxy, ethoxy, propoxy and butoxy; and examples of $C_{1-4}$ haloalkyl are groups in which the above alkyl group is substituted with fluorine, chlorine or bromine.

In the present invention, the number of R is 1 to 5, preferably 1 to 2. That is, the phenylene group or oxyphenylene group of A can have 1 to 5 of R as a substituent.

These phosphazene compounds are known compounds which are described in, for example, JP-A-164698/1983, JP-A-265394/1987, JP-A-103428/1988, and U.S. Pat. No. 4,613,548, and they can be prepared by, for example, reacting the oligomer of phosphonitrile halide, the alkali metal salt of phenols and alkali metal salt of fluoroalcohols. Examples of the oligomer of phosphonitrile halide are trimer of phosphonitrile chloride, tetramer of phosphonitrile chloride, and a mixture of them. Examples of phenols are phenol, methylphenol, methoxyphenol, trifluoromethoxyphenol, 3-hydroxybenzotrifluoride, and those which are described in U.S. Pat. No. 4,613,548. Examples of fluoroalcohols are 1,1,ω-trihydroperfluoroalcohols such as 1,1,3-trihydroperfluoropropanol and 1,1,5-trihydroperfluoropentanol, and a mixture of this with 2,2,3,3,3-pentafluoropropanol.

A phosphazene compound of the formula (1) with the desired value of a, b, x, y and z, can be obtained by changing suitably the kind and amount of phenols and fluoroalcohols at the time of preparation.

In the present invention, a phosphazene compound of the formula (1), as it is, can be used as a lubricant. Alternatively, a phosphazene compound of the formula (1) may be dissolved in a suitable organic solvent. Examples of organic solvent are aromatic hydrocarbon such as toluene and xylene, halogenated hydrocarbon such as methylene chloride, chloroform, 1,1,1-trichloroethane, 1,1,2-trichloroethane, trichlorotrifluoroethane (flon 113), ether such as diethyl ether, dimethoxyethane, dioxane and tetrahydrofuran, ester such as ethyl acetate, ethyl butyrate and amyl acetate, alicyclic hydrocarbon such as cyclohexane, cycloheptane and cyclooctane, dimethyl formamide, dimethyl sulfoxide, and a mixed solvent comprising at least two of them.

A phosphazene compound of the formula (1) of the invention can be used together with other lubricant, for example, fluorinated oil such as perfluoropolyether, polyphenyl ether synthetic oil, or other phosphazene compound. Examples of the fluorinated oil are:

$HOCH_2CF_2O(CF_2CF_2O)_r(CF_2O)_sCF_2CH_2OH$, wherein r is 5 to 30, and s is 5 to 30, piperonyl-$OCH_2CF_2O(CF_2CF_2O)_r(CF_2O)_sCF_2CH_2O$-piperonyl wherein r is 5 to 30, and s is 5 to 30, and $CF_3CF_2CF_2O(CF_2CF_2CF_2O)_tCF_2CF_3$ wherein t is 10 to 30.

Examples of the polyphenyl ether synthetic oil are an isomer mixture of bis(meta-phenoxyphenoxy)benzene, and alkyldiphenyl ether of formula:

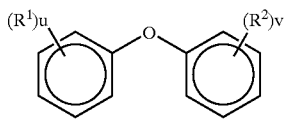

wherein $R^1$ and $R^2$ are hydrogen atom or hydrocarbon group having 8 to 24 carbon atoms, u and v are 0 or an integer, and u+v=1 to 4.

Examples of other phosphazene compound are:

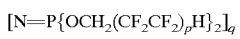

wherein p is 1, 2, 3 or 4, and q is 3 or 4, and

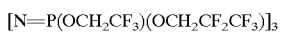

A lubricant of the invention is usually employed by forming its coat on a DLC protective layer. The formation of a lubricant layer of the invention is carried out in a known manner, e.g., application. When a lubricant of the invention is applied to a hard disk having a DLC protective layer, spin coating, dip coating or the like is employed. Although its layer thickness is not specifically limited, it may be usually about 10 to 200 Å, preferably about 10 to 50 Å. Adjustment of coat thickness depends upon the vapor pressure of an organic solvent, concentration of a phosphazene compound of the formula (1), drying temperature or the like. It is therefore accomplished by suitably selecting an organic solvent used, or adjusting the concentration or drying temperature.

BEST MODE OF CARRYING OUT THE INVENTION

The present invention will be described in detail with reference to the following Examples and Comparative Examples.

EXAMPLES 1 TO 11 and

Comparative Examples 1 to 4

A hard disk was immersed in a solution in which 1 g of a compound described in Table 1 was dissolved in 500 ml of toluene. After the disk was taken out and then dried at 120° C. for 30 minutes, a coat of a thickness of 20 to 30 Å is formed on the hard disk. This was then subjected to the following tests.

In the performance test of lubricants, a modified commercially available drive was used such that coefficient of friction was determined from the force applied to the head, and the test was carried out by measuring the change in coefficient of friction at the time of activation, in a CSS repeated test. A single CSS cycle took 33 seconds which comprises the steps of starting the drive with the head contacted on the disk surface, rotating the disk such as to reach a predetermined number of revolution of 3600 rpm with the head lifted, and stopping the drive with the head contacted with the disk surface. The hard disk was obtained by forming, with plasma CVD, a DLC protective layer of 200 to 300 Å on a 3.5-inch recording medium prepared by sputtering. For increasing the surface smoothness, no texture was used. The head was of monolithic MIG (metal in clearance), and the load was 7.5 g. In the CSS test, the lifetime was determined by the point of time at which coefficient of dynamic friction ($\mu$) exceeded 0.6. Table 2 shows the characteristics.

TABLE 1

| | | | Lubricant Compound | | | | | |
|---|---|---|---|---|---|---|---|---|
| | a | b | x | y | z | R | B | |
| Example | | | | | | | | |
| 1 | 1 | 1 | 1 | 3 | 0 | H | $CF_2CF_2$ |
| 2 | 0.5 | 1.5 | 2 | 3 | 0 | H | $CF_2CF_2$ |
| 3 | 1 | 1 | 2 | 3 | 0 | H | $CF_2CF_2$ |
| 4 | 1 | 1 | 3 | 3 | 0 | H | $CF_2CF_2$ |
| 5 | 1 | 1 | 4 | 3 | 0 | H | $CF_2CF_2$ |
| 6 | 1 | 1 | 2 | 4 | 0 | H | $CF_2CF_2$ |
| 7 | 1 | 1 | 2 | 3 | 0 | $CH_3$ | $CF_2CF_2$ |
| 8 | 1 | 1 | 2 | 3 | 0 | $OCH_3$ | $CF_2CF_2$ |
| 9 | 1 | 1 | 2 | 3 | 0 | $CF_3$ | $CF_2CF_2$ |
| 10 | 1 | 1 | 3 | 3 | 0 | $CF_3$ | $CF_2CF_2$ |
| 11 | 1 | 1 | 2 | 4 | 0 | $CH_3$ | $CF_2CF_2$ |
| Com. Ex. | | | | | | | | |
| 1 | 0 | 2 | 1 | 3 | 0 | — | $CF_2CF_2$ |
| 2 | | | PFPE-OH | | | | | |
| 3 | | | NF-10 | | | | | |
| 4 | | | None | | | | | |

TABLE 2

| | | Low speed friction coefficient (initial) | CSS lifetime (cycle) $\mu = 0.6$ | State of disc |
|---|---|---|---|---|
| Ex. | 1 | 0.183 | 20000 | No disorder |
| | 2 | 0.181 | 23000 | No disorder |
| | 3 | 0.184 | 25000 | No disorder |
| | 4 | 0.184 | 28000 | No disorder |
| | 5 | 0.198 | 26000 | No disorder |
| | 6 | 0.195 | 24000 | No disorder |
| | 7 | 0.190 | 24000 | No disorder |
| | 8 | 0.197 | 22000 | No disorder |
| | 9 | 0.182 | 29000 | No disorder |
| | 10 | 0.185 | 32000 | No disorder |
| | 11 | 0.201 | 20000 | No disorder |
| Com.Ex. | 1 | 0.133 | 2600 | Static friction coefficient ($\mu$) over |
| | 2 | 0.300 | 6000 | Static friction coefficient ($\mu$) over |
| | 3 | 0.120 | 2200 | Static friction coefficient ($\mu$) over |
| | 4 | 0.296 | 10 | Lubricant adheres to head, damage |

R is substituted at the meta position.

PFPE-OH: $F[CF(CF_3)CF_2O]_nCF(CF_3)CH_2OH$, having an average molecular weight of about 2000.

NF-10: $[N=P(OCH_2CF_3)(OCH_2CF_2CF_3)]_3$

EXAMPLES 12 TO 20

A similar test was conducted except that the compounds described in Table 3 were used instead of the compounds described in Table 1. Table 4 shows the results.

TABLE 3

| | | | Lubricant Compound | | | | | | |
|---|---|---|---|---|---|---|---|---|---|
| | a | b | x | v | z | A | R | B |
| Example | | | | | | | | | |
| 12 | 1 | 1 | 2 | 3 | 1 | $-OC_6H_4-$ | H | $CF_2CF_2$ |
| 13 | 1 | 1 | 3 | 3 | 1 | $-OC_6H_4-$ | H | $CF_2CF_2$ |
| 14 | 4/3 | 2/3 | 3 | 3 | 1 | $-OC_6H_4-$ | H | $CF_2CF_2$ |
| 15 | 1 | 1 | 4 | 3 | 1 | $-OC_6H_4-$ | H | $CF_2CF_2$ |
| 16 | 1 | 1 | 3 | 4 | 1 | $-OC_6H_4-$ | H | $CF_2CF_2$ |
| 17 | 1 | 1 | 3 | 3 | 1 | $-OC_6H_4-$ | $CH_3$ | $CF_2CF_2$ |
| 18 | 1 | 1 | 3 | 3 | 1 | $-OC_6H_4-$ | $CF_3$ | $CF_2CF_2$ |
| 19 | 1 | 1 | 2 | 3 | 1 | $-C_6H_4-$ | H | $CF_2CF_2$ |
| 20 | 1 | 1 | 3 | 3 | 1 | $-C_6H_4-$ | H | $CF_2CF_2$ |

TABLE 4

| | | Low speed friction coefficient (initial) | CSS lifetime (cycle) $\mu = 0.6$ | State of disc |
|---|---|---|---|---|
| Ex. | 12 | 0.185 | 22000 | No disorder |
| | 13 | 0.185 | 27000 | No disorder |
| | 14 | 0.180 | 25000 | No disorder |
| | 15 | 0.192 | 25000 | No disorder |
| | 16 | 0.195 | 23000 | No disorder |
| | 17 | 0.198 | 26000 | No disorder |
| | 18 | 0.184 | 31000 | No disorder |
| | 19 | 0.188 | 20000 | No disorder |
| | 20 | 0.189 | 21000 | No disorder |

Industrial Applicability

The present invention provides a lubricant for magnetic recording medium which has excellent CSS durability. The lubricant is useful as a lubricant for magnetic recording medium, such as hard disks of large-capacity recording medium, and metal vapor-deposited tapes for 8 mm video tape recorder or digital video cassette.

What is claimed is:

1. A magnetic recording medium comprising a hard disk having a carbon protective layer on a surface thereof and a coating of a compound of formula (1) as a lubricant on the surface of the protective layer $$[N=P\{O(C_6H_4)-(A)_z-R\}_a\{OCH_2-(B)_xH\}_b]_y \quad (1)$$

wherein A is $-C_6H_4-$ or $-OC_6H_4-$, B is fluorine-containing alkylene group, R is hydrogen atom, fluorine atom, $C_{1-4}$ alkyl, $C_{1-4}$ alkoxy or $C_{1-4}$ haloalkyl, a and b are each a real number of from greater than zero to 2, satisfying a+b=2, x is 1, 2, 3 or 4, y is 3 or 4, and z is 1.

2. The magnetic recording medium of claim 1, wherein the coating of the compound of formula (1) as a lubricant on the surface of the protective layer has a thickness of from 10 to 200 Å.

3. The magnetic recording medium of claim 2, wherein the coating of the compound of formula (1) as a lubricant. on the surface of the protective layer has a thickness of from 10 to 50 Å.

\* \* \* \* \*

UNITED STATES PATENT AND TRADEMARK OFFICE
CERTIFICATE OF CORRECTION

PATENT NO. : 6,541,431 B1
DATED : April 1, 2003
INVENTOR(S) : Tamio Akada et al.

It is certified that error appears in the above-identified patent and that said Letters Patent is hereby corrected as shown below:

<u>Title page,</u>
Item [86], "§371 (c)(1), (2), (4) Date: Jan. 1, 2001" should be -- §371 (c)(1), (2), (4) Date: Jan. 22, 2001 --.

Signed and Sealed this

Twenty-sixth Day of August, 2003

JAMES E. ROGAN
*Director of the United States Patent and Trademark Office*